(12) United States Patent
Cobett

(10) Patent No.: US 6,743,275 B1
(45) Date of Patent: Jun. 1, 2004

(54) METHOD OF MAKING AND USING FERROUS METAL PARTICLE BRIQUETTES

(75) Inventor: Thomas A. Cobett, Strongville, OH (US)

(73) Assignee: Alternative Casting Technologies, LLC, Lake Bluff, IL (US)

( * ) Notice: Subject to any disclaimer, the term of this patent is extended or adjusted under 35 U.S.C. 154(b) by 0 days.

(21) Appl. No.: 10/165,817

(22) Filed: Jun. 7, 2002

Related U.S. Application Data

(63) Continuation of application No. 09/644,958, filed on Aug. 23, 2000, now abandoned, which is a continuation of application No. 09/575,226, filed on May 22, 2000, now abandoned.

(51) Int. Cl.[7] .......................... C21B 13/00; C22B 1/248
(52) U.S. Cl. ............................ 75/572; 75/316; 75/770; 75/773
(58) Field of Search ..................... 75/316, 572, 770, 75/773

(56) References Cited

U.S. PATENT DOCUMENTS

| | | | | |
|---|---|---|---|---|
| 2,802,732 A | * | 8/1957 | Crolius | 75/318 |
| 3,316,083 A | * | 4/1967 | Parsons | 75/318 |
| 3,374,085 A | * | 3/1968 | Stone | 75/771 |
| 3,765,869 A | | 10/1973 | Schlerloh | |
| 3,973,998 A | * | 8/1976 | Datta et al. | 106/74 |
| 4,020,027 A | | 4/1977 | Nicholas | |
| 4,069,015 A | * | 1/1978 | Ahrendt et al. | 422/7 |
| 4,105,457 A | | 8/1978 | Pietsch | |
| 4,116,679 A | | 9/1978 | Pietsch | |
| 4,269,256 A | | 5/1981 | Nakazawa | |
| 4,585,475 A | | 4/1986 | Fosnacht | |
| 4,756,761 A | | 7/1988 | Philip | |
| 5,232,610 A | | 8/1993 | McLaughlin | |
| 5,531,805 A | * | 7/1996 | Worner | 75/10.63 |
| 5,718,857 A | | 2/1998 | Howlett | |
| 5,830,815 A | | 11/1998 | Wagh | |
| 5,846,894 A | | 12/1998 | Singh | |
| 5,922,261 A | | 7/1999 | Ford | |
| 6,139,619 A | * | 10/2000 | Zaretskiy et al. | 106/629 |

FOREIGN PATENT DOCUMENTS

WO  WO 00/75384  12/2000

OTHER PUBLICATIONS

Lewis, Richard J. Hawley's Condensed Chemical Dictionary, 12th edition, 1993 pp. 204 and 239.*

* cited by examiner

*Primary Examiner*—Melvyn Andrews
(74) *Attorney, Agent, or Firm*—Michael Best & Friedrich LLP

(57) ABSTRACT

Ferrous metal briquettes made from ferrous metal particles and an alkaline metal silicate, for adding to ferrous melts to recycle the particles.

28 Claims, No Drawings

METHOD OF MAKING AND USING FERROUS METAL PARTICLE BRIQUETTES

This application is a continuation of U.S. patent application Ser. No. 09/644,958 filed Aug. 23, 2000 and entitled FERROUS METAL PARTICLE BRIQUETTES AND METHOD OF MAKING AND USING THEM, now abandoned which is a continuation of U.S. patent application Ser. No. 09/575,226 filed May 22, 2000 entitled BRIQUETTES OF FERROUS METAL PARTICLES WITH AN ALKALI METAL SILICATE FOR RECOVERY BY MELTING, now abandoned.

BACKGROUND OF THE INVENTION

Many methods of processing ferrous metal materials (iron and steel), such as crushing, grinding, cutting, polishing, machining, screening and melting ferrous metal parts, produce large amounts of fine ferrous metal particles. It is desirable to recover and reprocess these partides. The ferrous metal has significant value if it can be remelted by a foundry, smelter or steel making operation. It is also environmentally preferable to melt existing metal scrap instead of extracting new metal from the earth as ore.

Unfortunately, particles of ferrous metals will oxidize (rust) rapidly at ambient temperature, particularly in humid weather. When such ferrous particles are added to a hot melting furnace, they are likely to be oxidized so rapidly that they will bum before melting. Additionally, fine, light particles of ferrous metal are often blown out of the melt bath and into the atmosphere by heat convection or by the air blast from a cupola furnace. Finally, the iron in such iron oxide partides that do not bum and are not blown away are nevertheless difficult or inefficient to recover by melting, and often end up being lost into the slag produced as a byproduct of the melting process. Thus, most of the ferrous metal partides produced in ferrous metal processing are so problematic to recycle, that they are regarded as practically non-recyclable. They therefore are often placed in landfills and lost forever. A method of forming these fine ferrous metal particles into compacted masses or briquettes that resist oxidation and can be simply and efficiently re-melted in foundries, smelters or steel making operations, would constitute an important improvement in the current state of the art.

SUMMARY OF THE INVENTION

The present invention is directed to ferrous metal masses or briquettes bonded by a glassy binder coating and to a method of making those masses and using them in recycling ferrous metal particles.

The ferrous metal masses (iron and steel) comprise a mixture of at least 80% by weight ferrous metal particles and preferably over 90% by weight ferrous metal particles. They also include an alkali metal silicate. Forming the particles into briquettes makes it possible to conveniently and efficiently recycle the particles by adding them to a ferrous metal melt.

DETAILED DESCRIPTION OF THE INVENTION

In carrying out the method of the present invention, ferrous metal particles and an alkali metal silicate are mixed together in any convenient manner, and shaped into masses or briquettes, preferably compacted, and caused to cure or harden by gelation and/or dehydration. After curing, the mixture should be at least 80%, and preferably at least 90% by weight of ferrous metal with the balance being an alkali metal silicate and other inorganic impurities, such as silica sand.

The ferrous metal particles are recovered from ferrous metal processing, including crushing, grinding, cutting, polishing, and machining operations. The particles may range in size from fine powders to coarse grains. Particles in the range of about 100 mesh to about 10 mesh are preferred. However, larger and smaller particles can also be utilized. It is desirable to ensure that the ferrous metal particles are kept free from rust prior to being combined with the silicate. Various liquid alkaline alkali metal silicates may be used in the practice of the invention, including sodium silicate, potassium silicate, and lithium silicate. Among these, sodium silicate is preferred. Additionally, one or more silicates may be combined in the mixture. The silicate should be used in the form of an aqueous solution containing from about 20% to 50% by weight solids preferably 35% to 45% by weight solids, and most preferably about 38% by weight solids, with the balance water. Where the ferrous metal particles are provided in a form which already includes water, the alkali metal silicate may be provided, in whole or in part, in dry form so that the already present water supplies some or all of the water in the alkali metal solution.

Curing of the briquettes is believed to proceed by causing the alkali metal silicate solution to form a gel, which contracts and forces the water out of the ferrous metal/silicate mixture, thereby hardening the final product. Thus, during the curing of the briquettes, the moisture in the alkaline metal silicate solution is given up to the atmosphere.

Also, it is preferred that the gelling of the silicate be accelerated by adding an appropriate amount of an accelerant. For example, the following materials can be used as curing accelerants for this purpose: calcium silicate, aluminates such as calcium aluminate, sodium aluminate, magnesium aluminate, potassium aluminate and lithium aluminate; acetic acid esters such as ethylene glycol diacetate, ethylene glycol monoacetate, glycerol triacetate, glycerol diacetate, and glycerol monoacetate; carbonic acid esters such as ethylene carbonate and propylene carbonate; formic acid esters such as methyl formate and ethyl formate; lactic acid esters; adipic add esters; glutaric acid esters and succinic add esters. Injecting carbon dioxide gas into the mixture is another method of accelerating the curing process. Heating is yet another way to accelerate the curing, and may be used either alone or in combination with any of the other accelerants. Indeed, any known method used to cause the curing of the alkali metal silicates solutions may be utilized to harden the ferrous metal particles fines into convenient shapes.

In the absence of the addition of accelerants or the use of heating, the briquettes may be hardened by simply permitting them to dehydrate until hardened.

The mixture of ferrous metal particles and liquid alkaline alkali metal silicate solution is compacted into appropriately sized forms corresponding to the size and shape of the mass desired before allowing the mixture to cure, either slowly at ambient temperature, or more rapidly by adding accelerants as described above. The briquettes may be of any practical size convenient for melting in the particular furnace being used. For example, briquettes of about 2"×2"×2" up to 10"×10"×10" in size have been made and used in accordance with the invention in induction furnaces and in an Iron foundry cupola. Briquettes less than about 2"×2"×2" in size are less desirable because of the danger that they will be blown out of the melt bath.

Surprisingly, although one would expect the exposed ferrous metal particles to rust on the surface of the final briquette produced, this does not occur. Rather, the silicate forms a glassy coating on the ferrous metal partides, preventing the briquettes from rusting, even under humid conditions. Furthermore, porosity of the briquette would also be expected which would produce rusting that works its way through the briquette, weakening the briquette and reducing its reuse value. Again, surprisingly, this is not found not to be the case.

The melting point of the metal particles fines is controlled by their chemistry. When the briquettes are added to a hot melting furnace maintained at a temperature sufficiently high to cause melting of the metal particles fines, the entire briquette breaks up, releasing the iron into the melt, while the silicates float up to the surface to become part of the slag. For example, it has been found that many such briquettes will melt at a temperature of at least about 2400° F., and up to about 3000° F. This occurs with little or no loss of metal due to high temperature oxidation, and certainly no blow out of fine metal particles. Indeed, it is believed that the glassy coating of the ferrous metal particles by the silicate continues to remain in place at the high melting temperatures, until after the ferrous metal particles melt into the furnace bath, whereupon the sodium silicate becomes a part of the slag floating on top of the molten metal.

The following examples are intended to be illustrative of the present invention and to teach one of ordinary skill how to make and use the invention. These examples are not intended to limit the invention or its protection in any way.

EXAMPLE 1

A briquette in accordance with the present invention was prepared by combining 90% by weight of ferrous metal particles produced by grinding iron castings with 10% by weight of a solution of aqueous sodium silicate containing 42% by weight solids, which had a weight ratio of about 3.22 parts $SiO_2$ to about 1.0 part $Na_2O$. In other tests, it was found that a weight ratio of about 2.4 parts $SiO_2$ to about 1.0 part $Na_2O$ could be used and indeed, weight ratios of as low as 2.0 to 1.0, and as high as 4.0 to 1.0, will produce satisfactory briquettes. Acceptable solids contents of the aqueous sodium silicate solutions ranged from as low as about 20% to as high as 50%.

The materials were mixed for three minutes and compacted by hand into a plastic form to increase the density of the briquette. The form was inverted onto a plate and the resulting briquette carefully removed from the form. The briquette was allowed to dehydrate for 72 hours.

Several of the briquettes were placed outdoors in an unprotected area. A small pile of unbonded or free ferrous metal particles was placed next to the briquettes. After 90 days of weathering, including rain, snow, ice and sunlight, the briquettes exhibited no oxidation. The small pile of unbonded particles was completely covered with bright orange rust.

EXAMPLE 2

Five pounds of briquettes prepared as explained in Example 1, were placed on top of six pounds of liquid Class 30 gray iron that had been melted at a temperature of 2700° F., in a small electric induction furnace. The briquettes, which floated on the surface, gradually melted into the existing molten iron. The floating of the briquettes insured that any moisture present in the glassy coating within the interstices of the mass would evaporate and escape without entering the melt.

After removal of the slag on the surface of the molten metal, the iron was poured into an ingot mold and permitted to cool. After cooling, the ingot was weighed and found to be just slightly less than 11 pounds. This indicates nearly complete recovery of metal from the 5 pounds of briquettes. Additionally, the composition of the iron was verified as being acceptable Class 30 gray iron, which is a standard iron composition with 30,000 p.s.i. tensile strength.

EXAMPLE 3

A mixture of ferrous metal particles and sodium silicate solution was made as explained in Example 1. This mixture was compacted into plastic forms and carbon dioxide gas was injected at a pressure of 15 p.s.i., using a small lance. After 10 seconds of gassing, the partially cured mixture was easily removed from the form. The partially cured shapes were allowed to dehydrate, forming briquettes in accordance with the invention, and then were exposed to weather as in Example 1. They were also melted in an iron bath, as in Example 2. In all cases, the results were the same as in Examples 1 and 2.

EXAMPLE 4

In this example, a mixture of 89.2% by weight of fine ferrous metal particles generated by grinding iron castings, was combined with 10% by weight aqueous sodium silicate and 0.8% by weight of an accelerant, ethylene glycol diacetate. The materials were mixed for 3 minutes, and compacted by hand into a plastic form. After 15 minutes, a partially cured shape was easily removed from the form. The partially cured shape was allowed to dehydrate to form briquettes in accordance with the present invention and exposed to weather, as in Example 2. The shapes were also melted into an iron bath, as in Example 1. The same results achieved in Examples 1 and 2 were achieved in this example.

EXAMPLE 5

In this example, 10% by weight of the liquid sodium silicate was combined with 86% by weight of iron metal particles generated by grinding iron castings and 4.0% by weight sodium aluminate, which was added as an accelerant. The materials were mixed for 3 minutes and compacted by hand into a plastic form. After fifteen minutes, the mixture was easily removed from the form. These partially cured shapes were allowed to dehydrate, forming briquettes in accordance with the present invention. They were exposed to weather and melted into an iron bath, as in Examples 1 and 2, producing results commensurate with those Examples.

While the present invention is described above in connection with preferred or illustrative embodiments, these embodiments are not intended to be exhaustive or limiting of the invention. Rather, the invention is intended to cover all alternatives, modifications, and equivalents included within its spirit and scope, as defined by the appended claims.

What I claim is:

1. A method for making ferrous metal briquettes having ferrous metal particles bonded therein by an alkali metal silicate binder disposed throughout the briquettes comprising:

preparing a mixture containing at least 80% by weight ferrous metal particles and a solution consisting of an aqueous alkali metal silicate solution; next shaping the mixture of ferrous metal particles and aqueous alkali metal silicate solution into unitary briquettes; and then curing the unitary briquettes to form a hardened unitary product containing the ferrous metal particles.

2. The method of claim 1 in which the briquettes are compacted to increase their density.

3. The method of claim 1 in which the ferrous metal particles are supplied in an amount sufficient to provide the cured briquettes with over 80% by weight ferrous metal.

4. The method of claim 1 in which the ferrous metal particles are supplied in an amount sufficient to provide the cured briquettes with at least 90% by weight ferrous metal.

5. The method of claim 1 in which the ferrous metal particles range in size from fine to coarse.

6. The method of claim 1 in which the ferrous metal particles are from about 10 to about 100 mesh in size.

7. The method of claim 1 in which the ferrous metal particles are recovered from a ferrous metal processing operation chosen from the group consisting of crushing, grinding, cutting, polishing and machining.

8. The method of claim 1 in which the ferrous metal particles are free from rust before being mixed with the alkali metal silicate solution.

9. The method of claim 1 in which the alkali metal silicate is chosen from the group consisting of sodium silicate, potassium silicate, and lithium silicate.

10. The method of claim 9 in which the alkali metal silicate is sodium silicate.

11. The method of claim 10 in which the sodium silicate is in the form of an aqueous solution having $SiO_2$ and $Na_2O$ in a weight ratio from about 2.0 to 1.0 to about 4.0 to 2.0.

12. The method of claim 10 in which the sodium silicate is in the form of an aqueous solution having $SiO_2$ and $Na_2O$ in a weight ratio of about 3.22 to 1.0.

13. The method of claim 10 in which the sodium silicate is in the form of an aqueous solution having $SiO_2$ and $Na_2O$ in a weight ratio of about 2.4 to 1.0.

14. The method of claim 1 in which the alkali metal silicate is supplied in the form of an aqueous solution having from about 20% to about 50% by weight solids.

15. The method of claim 1 in which the alkali metal silicate is supplied in the form of an aqueous solution having about 38% by weight solids.

16. The method of claim 1 in which the curing is accelerated by adding a curing accelerant.

17. The method of claim 16 in which the curing accelerant is chosen from the group consisting of calcium silicate, aluminates, acetic acid esters, carbonic acid esters, formic acid esters, lactic acid esters, adipic acid esters, succinic acid esters, glutaric acid esters and acidic gases.

18. The method of claim 17 where the aluminates include calcium aluminate, sodium aluminate, magnesium aluminate, potassium aluminate or lithium aluminate; the acetic acid esters include ethylene glycol monoacetate, glycerol triacetate, glycerol diacetate, or glycerol monoacetate; the carbonic acid esters include ethylene carbonate or propylene carbonate; the formic acid esters include methyl formate and ethyl formate, and the acidic gases include carbon dioxide.

19. The method of claim 1 in which the curing of the briquettes is accelerated by heating.

20. The method of claim 1 in which the briquettes range in size from 2"×2"×2" to about 10"×10"×10" in size.

21. The method of claim 1 in which the briquettes are at least about 2"×2"×2" in size.

22. A method of recycling ferrous metal particles by first making ferrous metal briquettes at least 2"×2"×2" in size, the briquettes having ferrous metal particles bonded therein by an alkali metal silicate binder by mixing the ferrous metal particles and an aqueous solution consisting of an alkali metal silicate, next shaping the mixture of the ferrous metal particles and alkali metal silicate solution into briquettes, then curing the briquettes to form a hardened unitary product containing the particles, storing the briquettes as desired, and then floating the unitary briquettes on a ferrous metal melt maintained at a temperature sufficiently high to release moisture from the briquettes into the atmosphere and to melt the ferrous metal particles within the briquettes into the melt.

23. The method of claim 22 in which the ferrous metal melt is maintained at a temperature of about 2400° F. to about 3000° F.

24. The method of claim 22 in which the briquettes have at least 80% by weight ferrous metal.

25. The method of claim 22 in which the ferrous metal particles range in size from about 10 to about 100 mesh in size.

26. The method of claim 22 in which the alkali metal silicate is chosen from the group consisting of sodium silicate, potassium silicate, and lithium silicate.

27. The method of claim 22 in which the ferrous metal particles are recovered from a ferrous metal processing operation chosen from the group consisting of crushing, grinding, cutting, polishing, machining, screening and melting.

28. The method of claim 1 where the ferrous metal particles are provided in a form which already includes water, and the alkali metal silicate is provided, in whole or in part, in dry form so that the already present water supplies some or all of the water in the alkali metal silicate solution.

* * * * *